United States Patent
Bursztejn et al.

(10) Patent No.: US 6,226,278 B1
(45) Date of Patent: May 1, 2001

(54) TRANSMITTING THE PILOT DATA CHANNEL FOR EACH OPERATOR IN A SYSTEM FOR RADIO COMMUNICATION WITH MOBILE STATIONS

(75) Inventors: Jacques Bursztejn, Neuilly sur Seine; Vinod Kumar, Paris; Marco Fratti, Saint Germain en Laye; Jean-Pierre Balech, Antony, all of (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/093,032

(22) Filed: Jun. 8, 1998

(30) Foreign Application Priority Data

Jun. 9, 1997 (FR) .................................................. 97 07099

(51) Int. Cl.[7] .................................................. H04Q 7/00
(52) U.S. Cl. .......................................... 370/328; 455/511
(58) Field of Search ................... 455/511, 434; 370/310, 312, 313, 328, 329

(56) References Cited

U.S. PATENT DOCUMENTS 5,613,204   3/1997   Haberman et al. .................. 455/33.2
5,905,718 * 5/1999   Kurokami et al. .................... 370/328

FOREIGN PATENT DOCUMENTS

0565470A1   10/1993   (EP).
WO9013211   11/1990   (WO).

* cited by examiner

Primary Examiner—David R. Vincent
(74) Attorney, Agent, or Firm—Sughrue, Mion, Zinn, Macpeak & Seas, PLLC

(57) ABSTRACT

A system for radio communication with mobile stations, the system being of the type enabling one or more network operators to manage respective distinct networks. Each network is constituted by geographical cells and has mobile stations travelling therethrough. Each cell of a given network is associated with a base station through which those mobile stations that are located in the cell and that are subscribers with the operator managing the given network can communicate. In its own network, each operator transmits a pilot data channel supplying each mobile station with pilot data enabling it specifically to log-on to the network. According to the invention, the system further comprises a super-network made up of geographical super-cells each associated with a super-basestation. Each super-basestation transmits a data signal carrying the pilot data channel of the, or each, operator. In addition, each mobile station receives and processes said data signal so as to extract therefrom the pilot data channel of the operator with which it is a subscriber.

7 Claims, 1 Drawing Sheet

TRANSMITTING THE PILOT DATA CHANNEL FOR EACH OPERATOR IN A SYSTEM FOR RADIO COMMUNICATION WITH MOBILE STATIONS

FIELD OF THE INVENTION

The field of the invention is that of cellular systems for radio communication with mobile stations, and particularly but not exclusively, systems designed to implement the public GSM radio communication standard.

The term GSM standard is used herein to mean the GSM 900 standard ("Global System for Mobile communications" operating in the 900 MHz band) or the DCS 1800 standard ("Digital Cellular System, operating in the 1800 MHz band).

More precisely, the invention relates to transmitting the pilot channel of each operator in a system for radio communication with mobile stations.

BACKGROUND OF THE INVENTION

In general, a cellular radio communication system enables one or more network operators to manage respective distinct networks. When there are several networks, a single zone can be covered by the networks of distinct operators.

Each network is constituted by geographical cells through which mobile stations travel. Each cell of a given network is associated with a base station via which those mobile stations which are to be found in the cell and which subscribe with the operator managing the given network make calls.

Within the coverage zone of its network, each operator transmits a pilot data channel supplying each mobile station with pilot data enabling it, specifically, to log-on to the network, once it has decoded various items of system data relating in particular to the identity of the operator supplying coverage, the services available, which carriers to use, etc.

The quality of network coverage from the point of view of the pilot data channel can be assessed on the basis of the following criteria, in particular:

the time required for a mobile station to log-on initially with the network;

the total spectrum required for a network;

compatibility with future changes to the network and/or to services;

the outgoing data rate; and transmission times.

Traditionally, over its entire network, each operator reserves a plurality of radio carriers for transmitting its pilot data channel. Each cell has its own pilot data channel which is carried by a particular carrier known as the BCCH carrier, which carrier is transmitted at constant power by the base station associated with the cell.

To log-on initially with the operator of its network via one of the base stations of the network, a mobile station begins by scanning all of the radio carriers in the allocated spectrum in order to identify, amongst those carriers which are BCCH carriers, the carrier that it receives with the greatest power. It is assumed that the BCCH carrier received at greatest power is the carrier transmitted by the base station associated with the cell in which the mobile station is to be found. Thereafter the mobile station reads the pilot data (in particular the data that will enable it to access the network) as supplied by the pilot channel carried by the BCCH carrier.

In this way, in GSM, the mobile station may have to scan 125 existing carriers and to select the six carriers that are received with greatest power. Then it verifies that the first of the six selected carriers is a BCCH carrier by looking for pilot data of the kind transmitted by BCCH carriers only. If the first selected carrier is not a BCCH carrier, the mobile station moves onto the next selected station and repeats the same operation until it has found a BCCH carrier and the pilot data it carries.

Finally, on the basis of the pilot data read, it can request access on the random access channel (RACH) in order to log-on to the network of its operator.

That present technique for transmitting the pilot data channel of each operator suffers from several drawbacks.

Firstly, because of the need to scan through all possible carriers, the time required by a mobile station to access the network is relatively lengthy.

Another drawback is that each operator, independently of the other operators, must, both on a microcell basis and on a macrocell basis, decide on transmission levels and on reuse schemes within the various cells for the set of BCCH carriers that have been allocated thereto. Implementing this feature at operator level makes future changes difficult to implement.

Finally, coverage quality at the limits of cells is not satisfactory.

OBJECTS AND SUMMARY OF THE INVENTION

A particular object of the present invention is to mitigate these various drawbacks of the state of the art.

More precisely, one of the objects of the present invention is to provide a radio communication system in which transmission of the pilot data channel of each operator is optimized compared with the above-mentioned present solution.

Another object of the present invention is to provide such a technique for transmitting pilot data channels that makes it possible to reduce the time required by a mobile station to log-on with the network of its operator.

Another object of the invention is to provide such a technique for transmitting pilot data channels that makes it possible to simplify management of carrier allocation between the various carriers.

A further object of the present invention is to make it easier in the context of transmitting pilot data channels, to include new operators and/or new services in a given radio communication system.

Yet another object of the invention is to make it possible to improve radio coverage.

These various objects, and others that appear below, are achieved, according to the invention, by a system for radio communication with mobile stations, the system being of the type enabling a plurality of network operators each to manage a distinct network, each network being made up of geographical cells and having said mobile stations travelling therethrough, each cell of a given network being associated with a respective base station through which it can communicate with those of said mobile stations that are to be found in said cell and that are subscribers with the operator managing said given cell, each operator transmitting in its network a pilot data channel supplying each mobile station with pilot data enabling it, in particular, to log-on with said network, the system comprising:

a super-network made up of geographical super-cells each associated with a super-basestation, each super-basestation having means for transmitting a data signal carrying the pilot data channel of the, or each, of the operators, and each mobile station comprising means for receiving and processing said data signal so as to extract therefrom the pilot data channel of the operator with which it is a subscriber; and means for multiplexing the pilot data channels of the various operators on said data signal.

The general principle of the invention thus consists in implementing a separate network referred to as a "super-network" for transmitting the pilot data channel(s) on a common data signal.

Thus, for initial log-on with the network of its operator, a mobile station no longer needs to scan all of the radio frequencies of the allocated spectrum prior to being able to read the contents of the pilot data channel of its operator. All that is required of the mobile station, regardless of its position within the super-network, is to receive the data signal and to extract therefrom the pilot data channel of its operator.

In addition, each super-basestation transmits a data signal obtained by multiplexing pilot data channels from various operators.

Also, management of pilot data channel transmission can be centralized and thus optimized.

Furthermore, the arrival of a new operator is thus made easier to manage since all that is required is to add a new pilot data channel to the data signal already being transmitted by each super-cell.

It would be observed that with the invention, the pilot data channel of each operator is uniform per super-cell, whereas in the conventional configuration it is uniform per cell.

Advantageously, said pilot data supplied by the pilot data channel of each operator via a data signal transmitted by a given super-basestation belonging to the group, comprises:

data concerning the identity of said operator;

data concerning the presence or absence of said operator in the super-cell associated with said given super-basestation;

data concerning channel allocation in the network of said operator;

a data on the identity of the localization zone corresponding to said given super-cell;

data concerning the services available in the network of said operator; and data concerning the carrier(s), BCCH and/or other carrier, used in the cell(s) corresponding to said given super-cell.

It is clear that each pilot data channel does not necessarily contain all of the pilot data. Furthermore, the pilot data list is not exhaustive.

Preferably, said multiplexing means implement time division multiplexing and/or frequency division multiplexing and/or code division multiplexing.

In an advantageous embodiment of the invention, said data signal is transmitted over a single carrier for all of the super-basestations.

In this way, the means for receiving and processing the data signal, included in each mobile station are very simple and of low cost.

Preferably, said data signal is transmitted on a carrier using the OFDM technique.

Thus all of the advantages associated with the orthogonal frequency division multiplex (OFDM) technique can be used, and in particular better ability to withstand multipath distortion in the mobile channel, and intelligent selection of which frequencies to use.

In a particular embodiment of the invention, said super-network uses at least in part a network of the DAB or DVB type.

This makes it possible in particular to use the transmission capacity still available in an existing digital audio broadcasting (DAB) network or in an existing digital video broadcasting (DVB) network.

BRIEF DESCRIPTION OF THE DRAWING

Other characteristics and advantages of the invention appear on reading the following description of a preferred embodiment of the invention, given by way of non-limiting indication, and from the accompanying drawing, in which.

MORE DETAILED DESCRIPTION

The invention thus relates to a system for radio communication with mobile stations, the system being of the type enabling one or more network operators each to manage a distinct network, each network being constituted by geographical cells through which mobile stations travel.

Figure 1:
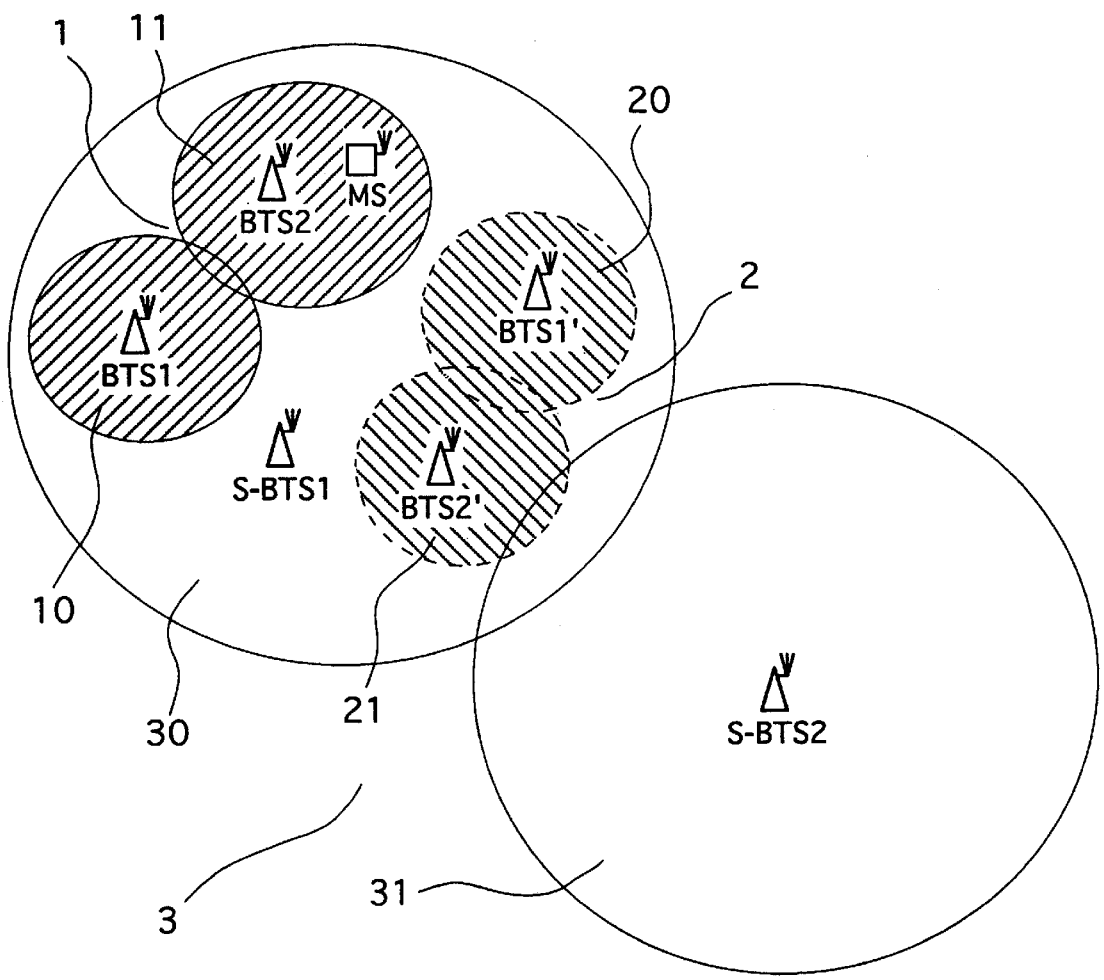
FIG. 1 is a fragmentary diagrammatic view of a radio communication system of the invention.

In the fragmentary diagrammatic view of FIG. 1, and for the purposes of simplification, the case is considered of a system shared between two networks having distinct operators 1 and 2. The person skilled in the art will easily be able to generalize to an arbitrary number of operator networks.

For each of these networks 1 and 2, only two cells are shown 10 & 11 and 20 & 21. Clearly, in reality, each network will comprise a large number of cells so as to cover as great an area as possible.

Each cell 10, 11, 20, and 21 is associated with a respective base station BTS1, BTS2, BTS1', BTS2' through which it can communicate with mobile stations that are located within the cell and that subscribe with the operator managing the particular cell.

Thus, with the example of FIG. 1, the mobile station referenced MS which is to be found in the cell referenced 11 can communicate via the base station referenced BTS2 providing it is a subscriber with the operator of the network referenced 1.

In FIG. 1, the coverage zones of the two networks 1 and 2 are disjoint. Nevertheless, it is clear that in entirely conventional manner, these two operator networks may cover the same zone.

Within its network, each operator must transmit a pilot data channel providing each mobile station with pilot data enabling it in particular to log-on to said network.

According to the present invention, the radio communication system has a super-network 3 specific to transmitting the pilot data channels of the various operators.

The super-network 3 is constituted by geographical super-cells 30 and 31 each associated with a super-basestation S-BTS1, S-BTS2. Each super-basestation S-BTS1, S-BTS2 has means for transmitting a data signal carrying the pilot data channels of all of the operators.

In other words, the data signal carries as many pilot data channels as there are operators sharing the radio communication system. The structure of this data signal is the same for all super-cells.

In contrast, it is clear that the pilot data channel of any one operator provides information that differs from one super-cell to another. It will be understood that the nature of the pilot data which an operator puts into its pilot data channel depends directly on the super-cell concerned, particularly since said data may specify the presence or the absence of the operator in a particular super-cell, or indeed because the information can include details concerning carriers (BCCH and/or other carriers) used in the cells corresponding to the super-cell.

Without being exhaustive, there follows a list of the kinds of pilot data that each operator might supply in its pilot data channel via a data signal that is broadcast by a given super-basestation:

data concerning the identity of the operator;
   data concerning the presence or absence of the operator within the super-cell associated with the given super-basestation;
   data concerning channel allocation in the operator network;
   data concerning the identity of the location zone corresponding to the given super-cell;
   data concerning the services available in the operator network; and
   data concerning the carrier(s), BCCH and/or other carriers, used in the cell(s) corresponding to the given super-cell.

In FIG. 1, only two super-cells 30 and 31 are shown. Clearly, in reality, the super-network 3 comprises a large number of super-cells so as to cover at least the same area as all of the operator networks. In other words, the set of super-cells 30, 31 in the super-network 3 covers substantially the same area as the set of cells 10, 11, 20, 21 of the various operator networks 1, 2.

It is clear that an operator might be present in some super-cells only. Similarly, a plurality of operators can be present in the same super-cell.

It will be observed that a super-cell 30, 31 can either be larger than a cell (in which case it will cover a plurality of cells 10, 11, 20, 21 in any given network, as shown in FIG. 1), or smaller (in which case it covers only a portion of a cell in a given network).

Also according to the present invention, each mobile station MS includes means for receiving and processing the data signal transmitted by the super-basestation associated with the super-cell in which it is to be found, so as to extract therefrom the pilot data channel of the operator with which it is a subscriber.

In order to build up the data to be transmitted in each super-cell, each operator must supply the super-network, e.g. a controller of super-basestations, with the pilot data to be transmitted over its pilot data channel. Thereafter, for each super-cell, the pilot data channels of the various operators are multiplexed so that all of them are carried by the data signal transmitted in the super-cell.

Figure 2:
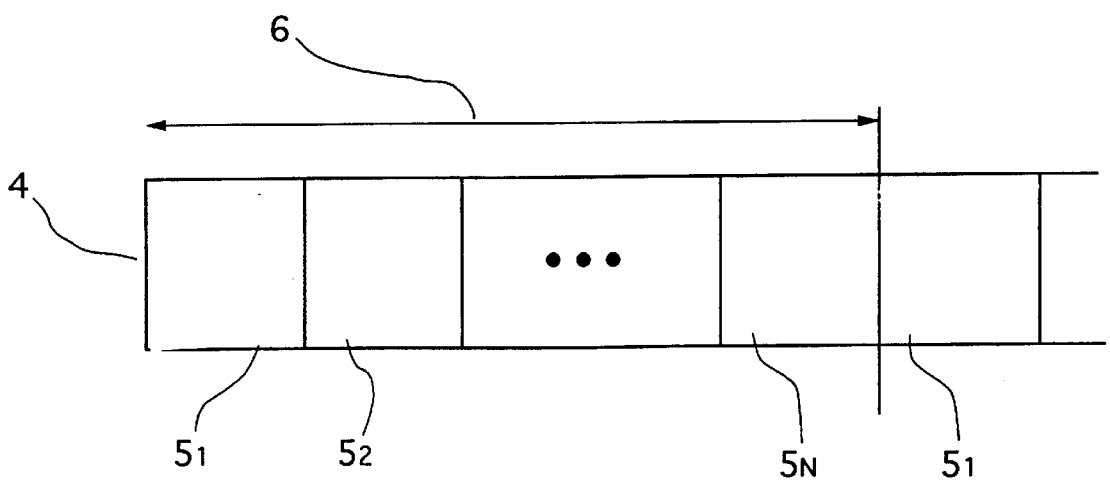
FIG. 2 shows one particular structure for the data signal carrying the various pilot data channels.

This multiplexing of pilot data channels belonging to different operators can be time division multiplexing (TDM) for example. Thus, FIG. 2 shows one particular structure for the data signal 4 carrying a time division multiplex of different pilot data channels. In this example, the multiplex may comprise up to N distinct pilot data channels. The time sequence 6 thus comprises N successive time slots $5_1$ to $5_N$.

It is clear that other types of multiplexing can be envisaged, frequency division multiplexing (FDM) or code division multiplexing (CDM) in particular, or indeed a combination of these various types of multiplexing.

By way of example, the super-network 3 makes use of part of an existing DAB (or DVB) type network, and the data signal 4 is transmitted on a single carrier that is identical for all of the super-cells, by using the OFDM technique.

Two ways of operating a super-cell of the invention are described below, and they differ in the role of the super-network once a mobile station has become aware of the pilot data channel of its own operator.

In the first implementation, the role of the super-network goes no further than informing each mobile station, via the data signal 4 transmitted in each super-cell, of the pilot data channel of its particular operator.

Under such circumstances, in each super-cell, each pilot channel provides the mobile station specifically with data concerning the BCCH carriers used in the cells corresponding to the super-cell. Thus, after it has received the pilot channel of its own operator and has detected the presence thereof, each mobile station:

selects one of the BCCH carriers its operator has identified via the pilot data channel so as to determine the base station with which it is going to communicate; and
   sends an access message over the RACH channel of the up link corresponding to the selected BCCH carrier so as to log-on to the network of its operator.

In the second embodiment, the super-network also handles the setting up of a call between the mobile station and the network of its operator. For that purpose, the mobile station identifies itself with the super-network and then remains connected thereto (for example until a call has been established or until it receives some other command from the super-network). The super-network then acts in a manner that is transparent to the mobile station to set up such a call in the operator network of said mobile station.

Under such circumstances, each mobile station has means for transmitting an access signal (equivalent to an RACH burst) to the super-basestation associated with the super-cell in which said mobile station is to be found. Thus, after receiving the pilot channel of its operator and detecting the presence of said operator, each mobile station sends an access signal so as to be logged on with the super-network.

Each super-basestation has means for receiving said access signal. The super-network comprises means for logging on all mobile stations that send such an access signal to the super-basestation. The super-network also includes means for handling call setup, with a mobile station that has logged on to the super-network switching over to the network of its own operator only after a call has actually been set up in the operator network, or on any other command from the super-network, or indeed in the event of a transfer between cells (handover) between a zone covered by the super-network and a zone that is not covered by the super-network.

What is claimed is:
1. A system for radio communication with mobile stations, the system being of the type enabling a plurality of network operators each to manage a distinct network, each network being made up of geographical cells and having said mobile stations travelling therethrough, each cell of a given network being associated with a respective base station through which it can communicate with those of said mobile stations that are to be found in said cell and that are subscribers with the operator managing said given cell,
   each operator transmitting in its network a pilot data channel supplying each mobile station with pilot data enabling it, in particular, to log-on with said network,
   the system comprising:
   a super-network made up of geographical super-cells each associated with a super-basestation, each super-basestation having means for transmitting a data signal carrying the pilot data channel of the, or each, of the operators, and each mobile station comprising means for receiving and processing said data signal so as to extract therefrom the pilot data channel of the operator with which it is a subscriber; and means for multiplexing the pilot data channels of the various operators on said data signal.

2. A system according to claim 1, wherein said pilot data supplied by the pilot data channel of each operator via a data signal transmitted by a given super-basestation belonging to the group, comprises:

data concerning the identity of said operator;

data concerning the presence or absence of said operator in the super-cell associated with said given super-basestation;

data concerning channel allocation in the network of said operator;

data on the identity of the localization zone corresponding to said given super-cell;

data concerning the services available in the network of said operator; and data concerning the carrier(s), BCCH and/or other carrier, used in the cell(s) corresponding to said given super-cell.

3. A system according to claim 1, wherein said multiplexing means implement time division multiplexing and/or frequency division multiplexing and/or code division multiplexing.

4. A system according to claim 1, wherein said data signal is transmitted over a single carrier for all of the super-basestations.

5. A system according to claim 4, wherein said data signal is transmitted over a carrier using the OFDM technique.

6. A system according to claim 1, wherein super-network uses, at least in part, a network of the DAB or the DVB type.

7. A system according to claim 1, wherein each mobile station further comprises means for transmitting an access signal to the super-basestation associated with the super-cell in which said mobile station is to be found, wherein each super-basestation comprises means for receiving said access signal; and wherein said super-network has means for logging on mobile stations that have caused an access signal to reach a super-basestation.

\* \* \* \* \*